United States Patent
French et al.

(10) Patent No.: US 10,830,449 B2
(45) Date of Patent: Nov. 10, 2020

(54) GAS SAFETY SHUTOFF

(71) Applicant: Lynx Grills, Inc., Downey, CA (US)

(72) Inventors: John T. French, Anaheim, CA (US); Randall Lee Dawson, Torrance, CA (US)

(73) Assignee: LYNX GRILLS, INC., Greenwood, MS (US)

( * ) Notice: Subject to any disclaimer, the term of this patent is extended or adjusted under 35 U.S.C. 154(b) by 103 days.

(21) Appl. No.: 16/211,676

(22) Filed: Dec. 6, 2018

(65) Prior Publication Data

US 2019/0107288 A1   Apr. 11, 2019

Related U.S. Application Data

(63) Continuation of application No. 15/167,797, filed on May 27, 2016, now Pat. No. 10,151,493.

(60) Provisional application No. 62/168,686, filed on May 29, 2015.

(51) Int. Cl.
| | |
|---|---|
| *F24C 3/12* | (2006.01) |
| *F23N 1/00* | (2006.01) |
| *F16K 31/524* | (2006.01) |
| *F16K 31/60* | (2006.01) |
| *F16K 31/06* | (2006.01) |

(Continued)

(52) U.S. Cl.
CPC ............ *F24C 3/12* (2013.01); *F16K 31/0675* (2013.01); *F16K 31/524* (2013.01); *F16K 31/60* (2013.01); *F16K 37/0025* (2013.01); *F23N 1/007* (2013.01); *F24C 3/103* (2013.01); *F24C 3/126* (2013.01); *F23N 2229/12* (2020.01)

(58) Field of Classification Search
CPC .. F24C 3/12; F24C 3/103; F24C 3/126; F16K 31/0675; F16K 31/524; F16K 31/60; F16K 37/0025; F23N 1/007
USPC ........................................ 431/18–20, 77–84
See application file for complete search history.

(56) References Cited

U.S. PATENT DOCUMENTS

| | | | |
|---|---|---|---|
| 355,314 | A | 1/1887 | Goodyear et al. |
| 737,676 | A | 9/1903 | Swartz |
| 1,542,241 | A | 6/1925 | Hartmann |

(Continued)

FOREIGN PATENT DOCUMENTS

GB        2292630 A        2/1996

OTHER PUBLICATIONS

International Search Report for PCT/US2016/034803, dated Jul. 12, 2016, 4 pp.

(Continued)

*Primary Examiner* — Vivek K Shirsat
(74) *Attorney, Agent, or Firm* — Barnes & Thornburg LLP

(57) ABSTRACT

A system for igniting a grill can include a solenoid valve, a flame rectification sensor, an igniter, and a control circuit connected to the solenoid valve and the flame rectification sensor. The solenoid valve controls flow of gas to the grill's burner and includes a switch that closes when a handle connected to the switch opens the solenoid valve. The control circuit sends current to the solenoid valve when the switch is closed to hold the solenoid valve open. After the switch closes, the igniter is ignited. After ignition, the control circuit monitors the presence of a flame with a flame rectification sensor. If no flame is detected after a certain amount of time, the control circuit stops sending current to the solenoid valve to close the solenoid valve.

15 Claims, 7 Drawing Sheets

(51) Int. Cl.
*F16K 37/00* (2006.01)
*F24C 3/10* (2006.01)

(56) References Cited

U.S. PATENT DOCUMENTS

| | | | |
|---|---|---|---|
| 1,716,329 A | 6/1929 | Simpson | |
| 1,971,449 A | 8/1934 | Harper | |
| 2,041,706 A | 5/1936 | Hahn | |
| 2,344,144 A | 3/1944 | Hobson | |
| 3,027,888 A | 4/1962 | DuFault et al. | |
| 3,472,220 A * | 10/1969 | Willson | G05D 23/1919 |
| | | | 126/110 R |
| 3,517,887 A | 6/1970 | Desty | |
| 4,278,419 A * | 7/1981 | Bechtel | F23N 5/203 |
| | | | 431/24 |
| 4,457,692 A * | 7/1984 | Erdman | F23N 1/022 |
| | | | 431/19 |
| 5,018,964 A | 5/1991 | Shah | |
| 5,511,535 A | 4/1996 | Landstrom et al. | |
| 5,628,242 A | 5/1997 | Higley | |
| 6,047,694 A | 4/2000 | Landstrom et al. | |
| 6,322,352 B1 | 11/2001 | Zink | |
| 6,439,881 B2 | 8/2002 | Haynes et al. | |
| 7,044,729 B2 * | 5/2006 | Ayastuy | F23N 5/027 |
| | | | 431/25 |
| 2006/0096585 A1 | 5/2006 | Dahl | |
| 2006/0260603 A1 | 11/2006 | Shah | |
| 2010/0043773 A1 * | 2/2010 | Aleardi | F23N 5/123 |
| | | | 126/39 BA |
| 2012/0282560 A1 * | 11/2012 | Cadima | F23Q 7/06 |
| | | | 431/258 |

OTHER PUBLICATIONS

Written Opinion for PCT/US2016/034803, dated Jul. 12, 2016, 5 pp.
CoorsTek Igniter Products 12 Volts Nominal Technical Data Sheet, 2012.
Pioneering Technology, "Powergrill™—The world's first remotely controlled grill," retrieved from http://www.pioneeringtech.com/powergrill, visited Feb. 27, 2014.

* cited by examiner

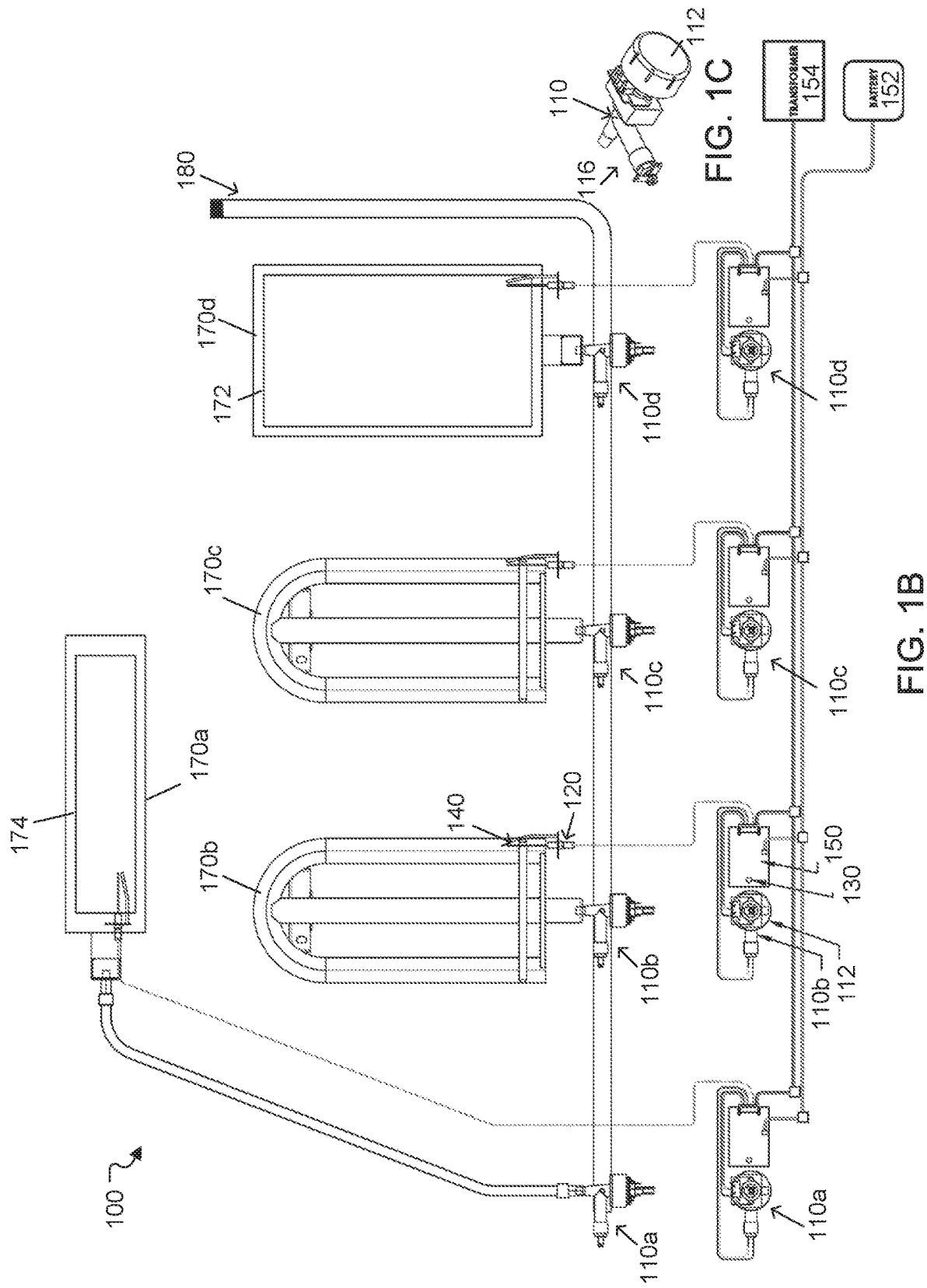

| | | | 302 |
|---|---|---|---|
| Switch | Off | | |
| Valve | Off | | |
| Solenoid | Off | | |
| Igniter | Off | | |
| Burner | Off | | |
| Sensor | No flame detected | | |

FIG. 3A

| | | | 304 |
|---|---|---|---|
| IGNITION | | | |
| Switch | ON | | |
| Valve | OPEN | Mechanically OPEN | |
| Solenoid | ON | millivolt current applied to valve | |
| Igniter | ON | | |
| Burner | Off | | |
| Sensor | No flame detected | | |

FIG. 3B

| | | | 306 |
|---|---|---|---|
| Switch | ON | | |
| Valve | OPEN | | |
| Solenoid | ON | | |
| Igniter | ON | | |
| Burner | ON | | |
| Sensor | Flame detected | | |

FIG. 3C

| 3 seconds after sensor registers flame, ingiter OFF | | |
|---|---|---|
| Switch | ON | |
| Valve | OPEN | |
| Solenoid | ON | |
| Igniter | OFF | |
| Burner | ON | |
| Sensor | Flame | detected |

| Sensor loses flame | | |
|---|---|---|
| Switch | ON | |
| Valve | OPEN | |
| Solenoid | ON | |
| Igniter | OFF | |
| Burner | FAILING | |
| Sensor | NO flame | detected |

| Sensor loses flame for 3 seconds, Igniter comes ON | | |
|---|---|---|
| Switch | ON | |
| Valve | OPEN | |
| Solenoid | ON | |
| Igniter | ON | |
| Burner | FAILING | |
| Sensor | NO flame | detected |

| PASS: Sensor reads flame within 10 seconds | | |
|---|---|---|
| Switch | ON | |
| Valve | OPEN | |
| Solenoid | ON | |
| Igniter | OFF | |
| Burner | ON | |
| Sensor | Flame | detected |

| FAIL: Sensor reads no flame for 10 seconds. | | |
|---|---|---|
| Switch | ON | |
| Valve | OPEN | |
| Solenoid | OFF | |
| Igniter | OFF | |
| Burner | OFF | |
| Sensor | NO flame | detected |

| RESET: valve swithch to OFF | | |
|---|---|---|
| Switch | OFF | |
| Valve | OFF | |
| Solenoid | OFF | |
| Igniter | OFF | |
| Burner | OFF | |
| Sensor | NO flame | detected |

GAS SAFETY SHUTOFF

CROSS REFERENCE TO RELATED APPLICATION(S)

This application is a continuation of U.S. Non Provisional patent application Ser. No. 15/167,797, filed May 27, 2016, which claims the priority benefit of Provisional Patent Application No. 62/168,686, entitled "GAS SAFETY SHUTOFF," filed May 29, 2015, the entirety of which are each fully incorporated herein by reference.

BACKGROUND

Grills or other cooking apparatuses use igniters to start flames. For gas grills, a valve disposed along a gas line is operated to control a flow of gas to a burner, and an igniter disposed downstream of the valve is operated to ignite gas flowing through an open valve to start a flame at the burner.

SUMMARY

A grill can include a safety shutoff apparatus for added safety. In some aspects of the subject technology, a safety shutoff can shut off a flow of gas in response to detection of a lack of flame at a burner using a flame sensor. In some implementations of the subject technology a flame sensor can include one or more components subject to wear, degradation, contamination, or a combination thereof (e.g., contamination of a sensor rod or a circuit board), which may impair functioning of the flame sensor, such as, for example, by causing a magnitude of a flame detection signal to drift over time, or diminishing reliability of the flame sensor.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1B schematically illustrates a grill apparatus according to example aspects of the present disclosure.

FIG. 1C illustrates a valve according to example aspects of the present disclosure.

FIGS. 3A-3D show tables corresponding to normal operating states for a gas safety shutoff apparatus according to example aspects of the present disclosure.

FIG. 3E-3I show tables corresponding to additional operating states for the gas safety shutoff apparatus according to example aspects of the present disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Figure 1A:
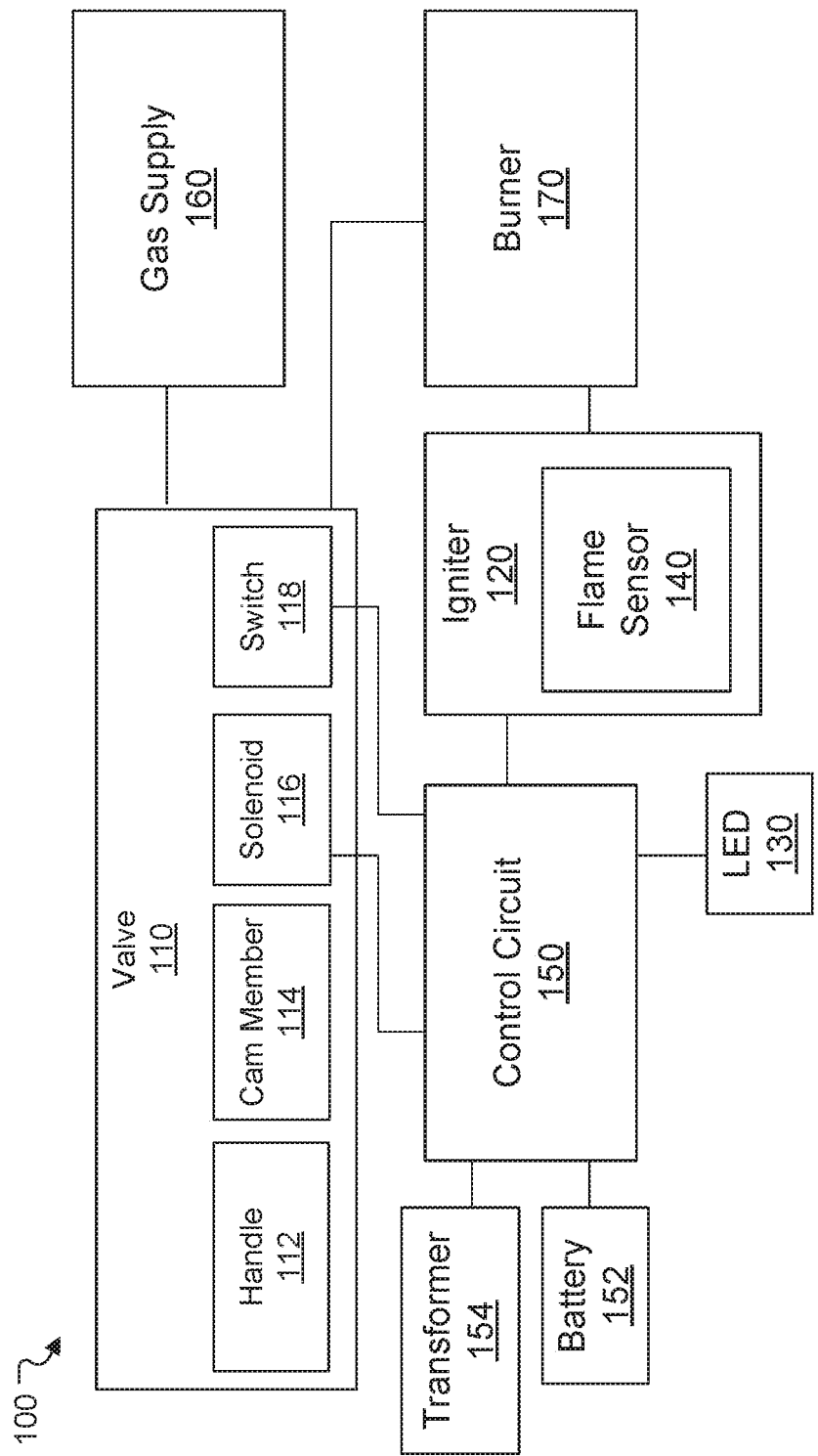
FIG. 1A illustrates a block diagram of a grill apparatus according to example aspects of the present disclosure.
Figure 1D:
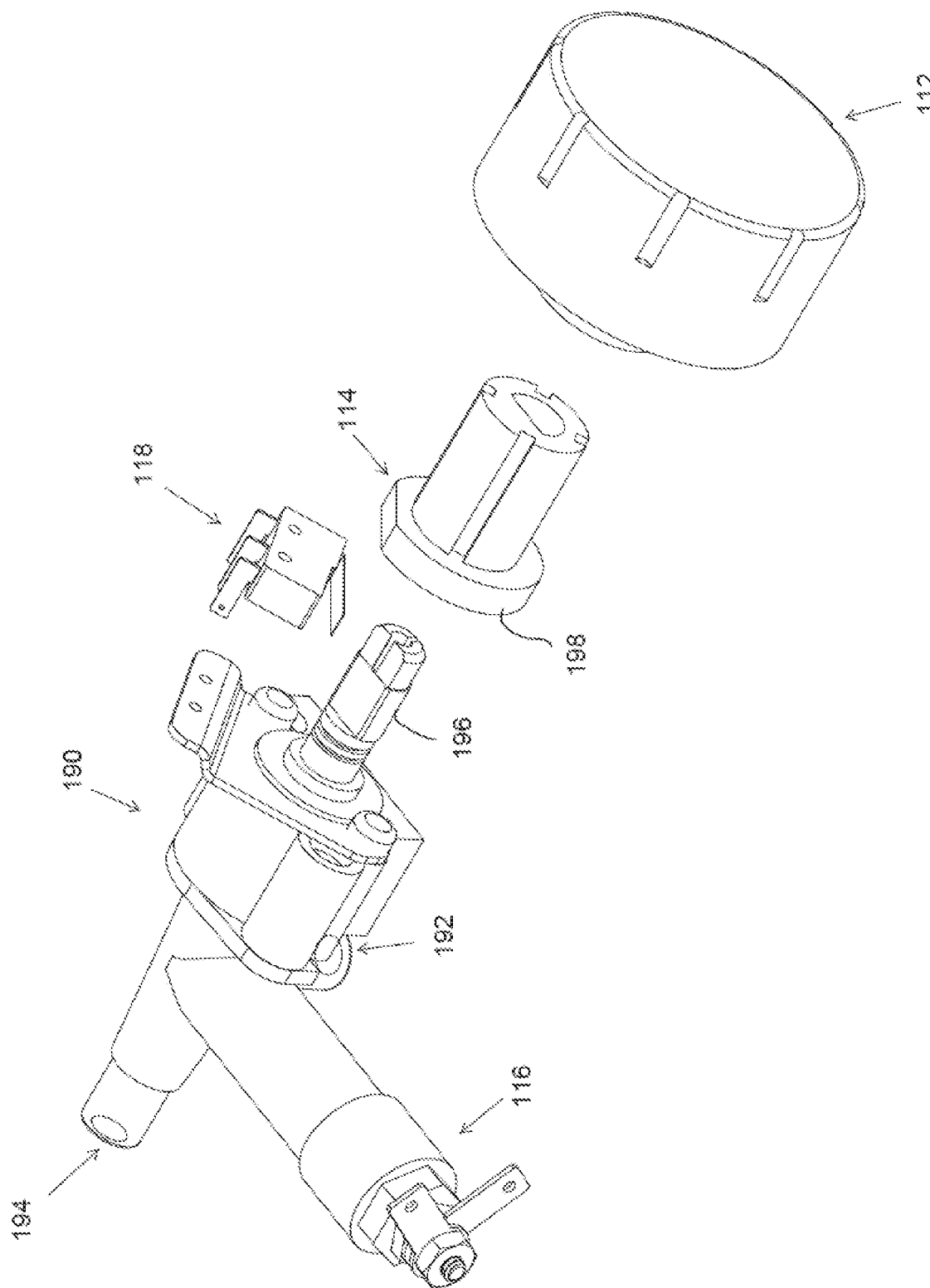
FIG. 1D is an exploded view of the valve 110 of FIG. 1C.

FIG. 1A illustrates a block diagram of a grill apparatus 100. FIG. 1B schematically illustrates an example grill apparatus 100. FIGS. 1C and 1D illustrate an example of a valve 110.

FIG. 1A illustrates the grill apparatus 100 comprising the valve 110, an igniter 120, a flame sensor 140, a control circuit 150, an LED 130, a gas supply 160, a burner 170, a transformer 154, and a battery 152 according to example aspects. The grill apparatus 100 may correspond to a grill, or another appliance that utilizes flame. The gas supply 160 can comprise a source of combustible gas, such as, for example, a tank or continuous flow system. The grill apparatus 100 can comprise a single valve 110 for a single burner 170, or can comprise multiple valves 110 for respective multiple burners 170, each valve being independently controllable. For example, the grill apparatus illustrated in FIG. 1B comprises four valves 110a, 110b, 110c, 110d for respective burners 170a, 170b, 170c, 170d. Two views of the four valves 110a, 110b, 110c, 110d are shown in FIG. 1B. One view of the valves illustrates the connection of the valves to a gas feed system. The other view of the valves illustrates electrical connections between the vales, control circuits 150, the battery 152, and the transformer 154. Although FIG. 1A illustrates the igniter 120 as comprising the flame sensor 140, in some aspects of the subject technology, the same combination of components (e.g., an electrode) can be operable to both ignite a flame and detect the presence of a flame. In some aspects of the subject technology, the igniter 120 and the flame sensor 140 can be independent, sharing no component between them.

FIG. 1B shows an example grill apparatus 100. In FIG. 1B, the grill apparatus 100 comprises multiple burners 170, including burners of different configurations, such as, for example, a sear burner 172 and a rotisserie burner 174. The gas supply 160 (FIG. 1A) is coupled to an inlet 180 of the gas feed system. The gas feed system can include pipes, hoses, and/or other apparatus for conducting the flow of gas. The gas feed system conducts gas from the gas supply 160 to each burner 170 through respective valves 110. Each burner 170 is coupled to a respective igniter 120. Each valve 110 is coupled to a respective control circuit 150 and LED 130. The transformer 154 and the battery 152 are connected to each control circuit 150.

The example valves illustrated in FIGS. 1A-1D each comprise a handle 112 (e.g., a knob), a cam member 114, a solenoid 116, and a switch 118. FIG. 1C illustrates an example valve 110 including its solenoid 116 and valve handle 112. FIG. 1D is an exploded view of the valve 110 of FIG. 1C. As shown for example in FIG. 1D, the valve 110 can comprise a valve body 190, an inlet 192, and an outlet 194. The valve can comprise trim, including one or more seats (which may be formed by the valve body), one or more valve members (e.g., plugs, balls, discs, etc.), and a stem 196. The valve member(s) can seal against the seat(s) to close a gas passage through the valve. The stem 196 can protrude from the valve body 190. The cam member 114 is attached to the stem 196 so that the stem moves with the cam member. The cam member 114 is attached to the handle 112 so that the cam member moves with the handle.

The valve 110 is connected to the gas supply 160. The valve 110 allows gas from the gas supply 160 to flow through the valve when it is open, and prevents gas from flowing through the valve when it is closed. The solenoid 116 can comprise an electromagnet that holds open the valve 110 when a current is provided, such as a current of about 180 mA. However, in some implementations of the subject technology, the solenoid 116 when activated by a current can hold the valve 110 open, but is unable to open the valve 110 from a closed state. In other words, the valve 110 may be mechanically opened through the valve handle 112 then held open by the solenoid 116, but cannot be pulled open by the solenoid alone. A valve comprising a solenoid is referred to herein as a solenoid valve.

The valve 110 is opened by physical manipulation (e.g., rotation, depression, or a combination thereof) of the valve handle 112 to mechanically open a passage through the valve. The position of the valve handle 112 can determine the extent to which the valve 110 is opened, to control a flow rate of the gas. In some implementations of the subject technology, the valve handle 112 is rotated counterclockwise while depressing it to open gas flow initially with depression not required for adjustment of the extent of gas flow thereafter. The valve handle 112 can be marked, for example, LO and HI, corresponding to a low flow rate, adjustable to a high flow rate. Manipulation of the valve handle 112 can move the cam member 114, which can be connected directly to the handle 112 and/or to a shaft (e.g., the stem 196) that is also connected to the valve handle 112. The cam member 114 comprises a cam 198 that is positioned, when the valve is assembled, to interact physically with the switch 118 to selectively actuate it based on a position of the cam member 114 relative to the switch 118. Sufficient movement (e.g., rotation) of the cam member 114 can close the switch 118. While the valve 110 is open, such as any position from LO to HI, the switch 118 can be closed by virtue of the position of the cam member 114.

The control circuit 150 can be an integrated circuit, and can comprise one or more sub-circuits. The control circuit 150 can comprise a single printed circuit board, or can be a master board with several slave boards. The control circuit 150 can include or be coupled to a power source. For example, the control circuit 150 can be powered by the transformer 154, which can be as a 12 VDC, 5-8 Amp center-tapped transformer. Additionally or alternatively, the control circuit 150 can be powered by the battery 152. In some implementations, the transformer 154 can trickle charge the battery 152. The control circuit 150 can communicate electrically with the igniter 120, LED 130, flame sensor 140, solenoid 116, and switch 118.

When the switch 118 is closed (activated), the control circuit 150 sends a current to the solenoid 116 of the valve 110. The current can be a millivolt current sent to the solenoid 116 of the valve 110. In FIG. 1B, solenoid control signals are sent through two wires, although in other implementations more or fewer wires can be used. The solenoid 116 holds the valve open under control of the control circuit 150 while the switch 118 is closed.

The control circuit 150 can power the LED 130, so that it illuminates, when the switch 118 is activated, to indicate the attempt to light or ignite the burner. The LED 130 can be a 1.5 VDC blue LED, which begins flashing to indicate the ignition attempt. In other implementations, the LED 130 can be another color LED or other visual or audible indicator.

When the switch 118 is initially activated, the control circuit 150 can send an ignition current to the igniter 120. The igniter 120 can be any igniter configured to ignite a burner. For example, the igniter can be a direct-spark igniter, a hot-surface igniter (e.g., a ceramic hot-surface igniter), or any other electrically powered ignition system. In certain implementations, the igniter 120 can also comprise the flame sensor 140. In some such implementations, flame sensing can be inactive during application of ignition current to the igniter. For example, a detection signal, which can be an AC signal, can be continuously applied to the flame sensor 140, e.g., by the control circuit 150, to detect the presence or absence of flame (e.g., when an AC signal is rectified by a flame to a DC signal). In some implementations, the detection signal is not sent to the igniter, e.g., by the control circuit 150, while the ignition current (e.g., a 12 VDC signal) is sent to the igniter. In some implementations, the detection signal and ignition current can be switched back and forth rapidly, e.g., by the control circuit 150, to achieve near-simultaneous ignition and flame sensing. In some implementations, such as those wherein components of the igniter 120 and the flame sensor 140 are separate or discrete, the detection signal can be sent, e.g., by the control circuit 150, to the flame sensor concurrently with application of ignition current to the igniter, e.g., by the control circuit 150.

When the valve 110 is open (e.g., held open by a solenoid 116), the igniter 120 can ignite gas flowing toward the burner from the valve 110. As a safety precaution, gas flow can be shut off if the gas does not ignite. For example, the igniter 120 can be on for a period, e.g., 5-6 seconds, then turned off for a period, e.g., 3 seconds, while presence or absence of a flame is detected.

In some implementations, presence or absence of a flame is detected by a flame sensor 140 by rectification of a detection signal passed through the flame sensor, which can be integrated partially or entirely with or discrete from the igniter 120. In some implementations, the flame sensor direct current of the detection signal through a location where a flame may be present during normal burner operation. For example, the flame sensor can comprise an electrode positioned such that the location where a flame may be present during normal burner operation is intersected by an arc of current between electrode components. The flame sensor 140 can be activated, by sending the detection signal to the flame sensor, before ignition current is sent to the igniter 120. For example, in response to the switch 118 being activated, the control circuit 150 can active the flame sensor 140, and after a sensor activation period, such as 100 ms, the control circuit 150 can send an ignition current to the igniter 120. Alternatively, the flame sensor 140 can be always on when the grill apparatus 100 is on. The control circuit 150 can continuously or intermittently monitor the detection signal from the flame sensor 140 through some or all of the process for igniting the corresponding burner. Additionally or alternatively, the control circuit 150 can continuously or intermittently monitor the detection signal from the flame sensor 140 after a process for igniting the corresponding burner has concluded.

A change in the detection signal can indicate the presence of flame, or successful ignition. In some implementations, the control circuit 150 monitors for sudden changes in the flame rectifier signal. For example, the detection signal can have a wave form when no flame is present, but flatten in response to flame rectification. In some implementations, presence or absence of a flame can be determined by the control circuit based on an absolute value of a parameter of the detection signal (e.g., voltage). Additionally or alternatively, presence or absence of a flame can be determined by the control circuit based on a change (e.g., a magnitude of change) of a value of a parameter of the detection signal (e.g., voltage). In some implementations, presence or absence of a flame can be determined by the control circuit based on a derivative of the detection signal over a period including at a time before ignition or before an ignition process being.

Advantageously, some implementations of the subject technology can detect presence or absence of a flame independently of an absolute threshold value of a parameter of the detection signal (e.g., voltage). In implementations wherein one or more component of the flame sensor 140 (e.g., such as portions of the switch 118, the control circuit 150, or a rod (e.g., of an electrode) protruding to a location where flame is expected to be present continuously or intermittently during use of a burner) can be worn, degraded, contaminated, or a combination thereof over time, altering characteristics of the components that may cause absolute values of the detection signal, in otherwise similar conditions, to drift. Thus, such wear, degradation, or contamination may cause inaccurate or unreliable determination of presence or absence of a flame based on an absolute value of a parameter of the detection signal, such as by determining whether an absolute value of a parameter of the detection signal passes a static threshold value. Degradation can be caused by, for example, rusting of materials and resistivity changes due to hot/cold cycles. Contamination can be caused by, for instance, salt, grease, or food contacting parts of the flame sensor 140. In some aspects of the subject technology, by determining presence or absence of a flame based on identification of a change in the detection signal from before activating the igniter to a time during or after activating the igniter, rather than an absolute value, the effects of wear, degradation, contamination, or a combination thereof can be reduced.

For example, degradation to the flame sensor 140 can cause the absolute value of the detection signal received from the flame sensor to drift lower under otherwise similar circumstances. For example, a degraded flame sensor 140 may produce, when a flame is present, a detection signal having an absolute value that is below an absolute value threshold for detection based on flame rectification. On the other hand, even if an absolute value of a parameter of the detection signal drifts, a degraded flame sensor 140 can still produce a detection signal having a parameter that changes in absolute value between a time when a flame is not present to a time when a flame is present. Such a change in the detection signal can still be detected by the control circuit despite the drifting of absolute values.

While the ignition current is sent to the igniter 120, the valve 110 is held open by the solenoid 116 for at least an ignition period, which can be 10 seconds. The flame sensor 140 continues to detect flame from a time before the ignition current is sent until at least a time during the ignition period. If presence of a flame is detected (e.g., rectification of the detection signal received from the flame sensor is identified) within the ignition period, the solenoid 116 remains active and the valve 110 remains open. In some implementations, the ignition current is applied to the igniter 120 for an entire predetermined ignition period, such as 3 seconds, even after the presence of a flame has been detected. In some implementations, the flame sensor continuously monitors the status of flame following detection of the presence of a flame, the end of an ignition period, or both. The LED 130 is updated to a normal status, which can be solid blue. The burner is then in a normal operation.

In some implementations of the subject technology, if the presence of a flame is not detected (e.g., rectification of the detection signal received from the flame sensor is not identified) within the ignition period, the valve 110 is closed. The valve 110 can be closed by the control circuit 150 ceasing to deliver current to the solenoid 116 of the valve 110. In some implementations, the control circuit 150 controls the LED 130 to indicate a fail status. For example, the control circuit 150 can send a signal to the LED or cease delivery of a signal to the LED. A fail status can be indicated by a change to the state of the LED, such as for example, by changing form a continuously illuminated or unilluminated state to a blinking light. The color of the light can additionally or alternatively be altered, e.g., changed from blue to red.

In a failed ignition state gas has been flowing through a valve for a specified period of time without detection of the presence of a flame, or with detection of a flame of insufficient stability, at the burner. In some implementations, if the control circuit 150 detects a failed ignition state (e.g., by determining that the detection signal from the flame sensor 140 is not rectified, insufficiently rectified, or consistency of rectification is insufficient) for an entire duration of the ignition period or more, the control circuit 150 can close the valve 110 and update a status of the LED 130 to indicate ignition failure. If the control circuit 150 detects the presence of flame within the ignition period, the control circuit 150 can update a status of the LED 130 to indicate normal operational status. In some implementations, the control circuit 150 thereafter monitors, continuously or at intervals, a state of the flame.

In a flame failing state gas has been flowing through a valve and the presence of a flame was previously detected, or detected to be of sufficient stability, and during a period in which the valve has remained open since then a predetermined amount of time has elapsed without detection of the presence of a flame, or with detection of a flame of insufficient stability, at the burner. In some implementations, if the control circuit 150 detects a failing state (e.g., by determining that the detection signal from the flame sensor 140 is not rectified, insufficiently rectified, or consistency of rectification is insufficient) for a predetermined period of time during normal operation, the control circuit 150 can re-energize or otherwise reactivate the igniter 120. The control circuit 150 can update a state of the LED 130 to indicate performance of an attempt at re-ignition, such as flashing blue as described above. If the control circuit 150 does not detect successful ignition (e.g., by determining that the detection signal from the flame sensor 140 is not rectified, insufficiently rectified, or consistency of rectification is insufficient) for a predetermined period, the control circuit 150 can close the valve 110 and update a status of the LED 130 to indicate ignition failure. If the control circuit 150 detects the presence of flame within the predetermined period, the control circuit 150 can update a status of the LED 130 to indicate normal operational status. In some implementations, the control circuit 150 thereafter monitors, continuously or at intervals, a state of the flame.

If the control circuit 150 detects a failed ignition state or a failed re-ignition state, the control circuit 150 can close the valve 110 and update the LED 130 to indicate a fail status, and the control circuit 150 locks out the valve 110 for at least a lockout period, such as 30 or 45 seconds, in which the control circuit 150 will not activate the solenoid 116, to allow the released gas to dissipate.

Figure 2:
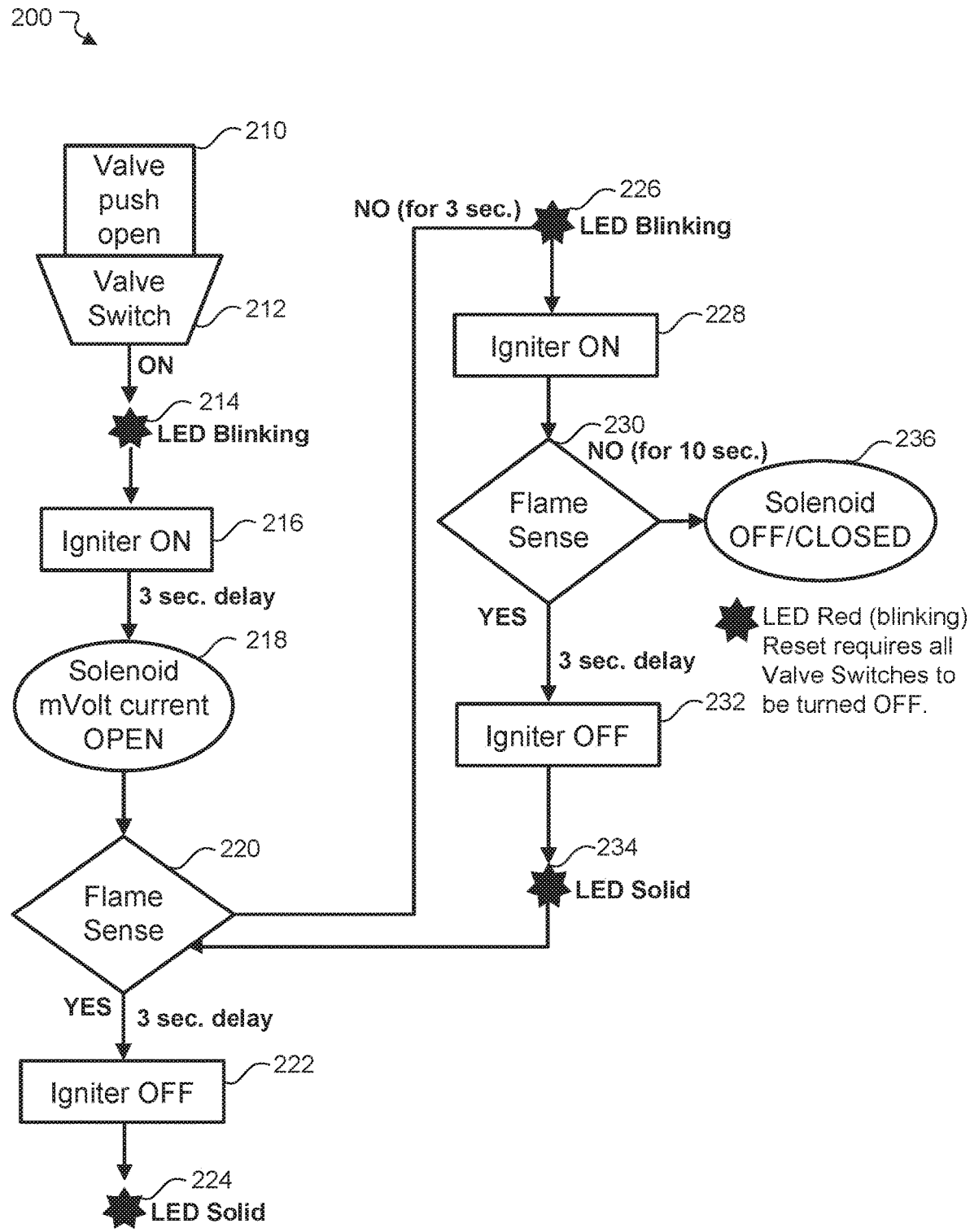
FIG. 2 shows a flowchart of a process of automatically shutting off a gas valve according to example aspects of the present disclosure.

FIG. 2 shows a flowchart 200 of an example process for operating a grill apparatus 100 according to some aspects of the subject technology. The example process of FIG. 2 includes a process for automatically shutting off a gas valve of a burner for a grill according to example aspects. FIGS. 3A-3I show tables corresponding to various states during the process illustrated by FIG. 2 according to example aspects. At state 302, shown in the table of FIG. 3A, the burner starts with (a) a switch (e.g., switch 118) in an off state, (b) the valve (e.g., valve 110) being off such that gas does not flow through the valve, (c) the solenoid (e.g., solenoid 116) being off, (d) the igniter (e.g., igniter 120) off, (e) the burner being off such that no flame is present, and (f) the sensor (e.g., flame sensor 140) is not indicating the presence of a flame.

In state 304, shown in the table of FIG. 3B, the valve has been mechanically opened (block 210), which activates the switch (block 212) to an on state. The control circuit 150 begins blinking the LED (e.g., LED 130) (block 214) to indicate performance of an ignition attempt. The control circuit 150 activates the igniter (block 216) and applies a current to activate the solenoid (block 218) with a 3 second delay. In state 304, shown in the table of FIG. 3C, the burner is off, and no flame is detected by the control circuit 150 based on a signal received from the sensor. The control circuit 150 continues to monitor for the flame (block 220) based on a signal received from the sensor.

When the control circuit 150 detects a flame at state 306, the burner is on. The control circuit 150 applies a 3 second delay before shutting off the igniter (block 222) at state 308, shown in the table of FIG. 3D. The control circuit 150 continuously powers (turns on) the LED (block 224) to indicate the burner is on.

However, if the control circuit 150 does not detect the presence of flame for at least 3 seconds (block 226) then, at state 310, shown in the table of FIG. 3E, the control circuit 150 determines that the burner is failing and causes the LED to blink (block 226) to indicate ignition attempt, and turns on the igniter (block 228) at state 312, shown in the table of FIG. 3F.

The control circuit 150 monitors for presence of a flame for at least 10 seconds (block 230) based on a signal received from the sensor. If the control circuit 150 detects the presence of a flame within the 10 seconds, then after applying a 3 second delay the control circuit 150 shuts off the igniter (block 232), and continuously powers (turns on) the LED to indicate the burner is on (block 234) to reach a pass state 314, shown in the table of FIG. 3G. If the control circuit 150 fails to detect the presence of a flame within the 10 seconds based on the signal received from the sensor, the control circuit 150 deactivates the solenoid to close the passage through the valve (block 236) at the fail state 316, shown in the table of FIG. 3H, although the handle of valve can still be in an ON position. The control circuit 150 powers the LED so that it begins blinking (and may change the color to red) to indicate failure and a need for reset. In certain implementations, if the control circuit 150 deactivates the solenoid valve to close the passage through the valve, the control circuit 150 keeps the solenoid deactivated for at least a purge duration, such as 45 seconds, to allow any built up gas to purge. If a handle of the valve is still in the ON position, the handle can be returned to an OFF position, e.g., physically returned by a user. At the reset state 318, shown in the table of FIG. 3I, the switch is off, the valve is closed, the solenoid is off, the igniter is off, the burner is off, and the sensor is not indicating the presence of a flame. The reset may place the burner back to the initial setting (e.g., state 302).

Although various aspects, features, and exemplifying embodiments of the subject technology have been described with reference to grills, the subject technology also can be practiced with other cooking appliances, such as ovens and stoves for example, in the place of the referenced grills.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what can be disclosed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially disclosed as such, one or more features from a disclosed combination can in some cases be excised from the combination, and the disclosed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following disclosure. For example, the actions recited in the disclosure can be performed in a different order and still achieve desirable results. As one example, the processes depicted in the accompanying figures do not necessarily require the particular order shown, or sequential order, to achieve desirable results. In certain implementations, multitasking and parallel processing can be advantageous. Other variations are within the scope of the disclosure.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A system for igniting a grill, the system comprising:

a solenoid valve comprising a switch and a handle, the switch actuated by manipulation of the handle, the solenoid valve configured to be held open by a current;

a flame rectification sensor configured to change a flame detection signal, an igniter; and a control circuit electrically coupled to the solenoid valve, the switch, and the flame rectification sensor, the control circuit configured to selectively send the current to the solenoid valve when the switch is closed, to determine presence of a flame based on the change to the flame detection signal, and to close the solenoid valve when the control circuit does not detect the presence of a flame after an ignition of the igniter.

Clause 2. The system of clause 1 or any of the clauses, wherein the control circuit is configured to determine presence of a flame by comparing the flame detection signal before the ignition and the flame detection signal after the ignition.

Clause 3. The system of clause 1 or any of the clauses, wherein the control circuit is configured to determine the presence of a flame by determining a derivative of a flame rectifier signal over a period from before the ignition to after the ignition.

Clause 4. The system of clause 1 or any of the clauses, wherein the flame rectification sensor comprises a spark igniter.

Clause 5. The system of clause 1 or any of the clauses, wherein the igniter is configured to ignite a gas using a hot ceramic surface.

Clause 6. The system of clause 1 or any of the clauses, further comprising a cam member mechanically coupled to the handle, wherein actuating the handle moves a cam of the cam member to close the switch.

Clause 7. The system of clause 6 or any of the clauses, wherein the cam is configured to hold the switch closed when the handle of the solenoid valve is in an open position.

Clause 8. The system of clause 1 or any of the clauses, wherein the control circuit comprises a power supply circuit.

Clause 9. The system of clause 1 or any of the clauses, wherein the control circuit comprises a center-tapped transformer.

Clause 10. The system of clause 1 or any of the clauses, wherein the solenoid valve cannot be opened by the current.

Clause 11. A method for igniting a grill, the method comprising:

actuating a handle to mechanically open a solenoid valve, and to move a cam configured to close a switch when the handle is moved to open the solenoid valve, the cam configured to hold the switch closed when the handle is in an open position;

when the switch is closed, selectively sending a current to the solenoid valve to hold the solenoid valve open;

in response to the switch closing, sending an ignition current to an igniter to start ignition of the igniter;

determining whether a flame is present based on a change to a flame detection signal from a flame rectification sensor; and after the presence of the flame has been determined, monitoring the flame detection signal for continued presence of the flame.

Clause 12. The method of clause 11 or any of the clauses, wherein determining whether a flame is present comprises reading the flame detection signal before the ignition and reading the flame detection signal after the ignition.

Clause 13. The method of clause 11 or any of the clauses, wherein determining whether a flame is present comprises determining a derivative of a flame detection signal over a period from before the ignition to after the ignition.

Clause 14. The method of clause 11 or any of the clauses, further comprising closing the solenoid valve in response to detecting that no flame is present after a predetermined period after commencing sending the ignition current to the igniter.

Clause 15. The method of clause 14 or any of the clauses, wherein closing the solenoid valve comprises ceasing delivery of current to a solenoid of the solenoid valve.

Clause 16. The method of clause 14 or any of the clauses, further comprising changing an LED to flash a warning color in response to detecting that no flame is present after a predetermined period after commencing sending the ignition current to the igniter.

Clause 17. The method of clause 11 or any of the clauses, further comprising:

determining that flame is no longer present; and in response to determining that flame is no longer present, sending an ignition current to the igniter.

Clause 18. The method of clause 11 or any of the clauses, further comprising closing the solenoid valve for at least a lockout period.

Clause 19. The method of clause 11 or any of the clauses, further comprising commencing flashing of an LED in response to actuation of the handle to mechanically open the solenoid valve.

Clause 20. The method of clause 11 or any of the clauses, further comprising continuously powering an LED in response to detection of the presence of a flame.

In an aspect, any of the clauses herein may depend from any one of the independent clauses or any one of the dependent clauses. In an aspect, any of the clauses (e.g., dependent or independent clauses) may be combined with any other one or more clauses (e.g., dependent or independent clauses). In an aspect, a clause may include some or all of the words (e.g., steps, operations, means or components) recited in a sentence, a phrase or a paragraph. In an aspect, a clause may include some or all of the words recited in one or more sentences, phrases or paragraphs. In an aspect, some of the words in each of the clauses, sentences, phrases or paragraphs may be removed. In an aspect, additional words or elements may be added to a clause, a sentence, a phrase or a paragraph. In an aspect, the subject technology may be implemented without utilizing some of the components, elements, functions or operations described herein. In an aspect, the subject technology may be implemented utilizing additional components, elements, functions or operations.

In an aspect, any methods, instructions, code, means, logic, components, blocks, modules and the like (e.g., software or hardware) described or recited in the clauses herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions are explicitly represented in drawings, but any of the clauses/descriptions can be represented in drawings in a manner similar to those drawings explicitly shown. For example, a flow chart can be drawn for any of the clauses or sentences for a method such that each operation or step is connected to the next operation or step by an arrow. In another example, a block diagram can be drawn for any of the clauses or sentences having means-for elements (e.g., means for performing an action) such that each means-for element can be represented as a module for element (e.g., a module for performing an action).

What is claimed is:

1. A system for igniting a grill, the system comprising:
a solenoid valve comprising a switch and a handle, the switch actuated by manipulation of the handle, the solenoid valve configured to be held open by a current;
a flame rectification sensor positioned to monitor for a presence or absence of a flame produced by a gas burner in a grill, the flame rectification sensor configured to provide a flame detection signal based upon a presence of a flame produced by the gas burner or based upon an absence of a flame produced by the gas burner,
an igniter; and
a control circuit electrically coupled to the solenoid valve, the igniter, the switch, and the flame rectification sensor, the control circuit configured to selectively send the current to the solenoid valve when the switch is closed,
the control circuit further configured to determine a presence of a flame produced by the gas burner based on identifying a change in the flame detection signal by a comparison of the flame detection signal received during a time before current was sent to the igniter and the flame detection signal received during a time after current was sent to the igniter, wherein the control circuit continues to provide current to the solenoid valve as long as the flame detection signal based upon the presence of the flame produced by the gas burner is continued to be received, and to close the solenoid valve by removing the current to the solenoid valve when the control circuit does not detect the presence of a flame by not identifying the change in the flame rectification signal within a predetermined period of time after current is sent to the igniter.

2. The system of claim 1, wherein the control circuit is configured to determine the presence of a flame being produced by the gas burner by determining a derivative of the signal from the flame rectification sensor over a period from before the ignition current is sent to the igniter to after the ignition current is sent to the igniter.

3. The system of claim 1, wherein the flame rectification sensor comprises a spark igniter.

4. The system of claim 1, wherein the igniter is configured to ignite a gas using a hot ceramic surface.

5. The system of claim 1, further comprising a cam member mechanically coupled to the handle, wherein actuating the handle moves a cam of the cam member to close the switch.

6. The system of claim 5, wherein the cam is configured to hold the switch closed when the handle of the solenoid valve is in an open position.

7. The system of claim 1, wherein the control circuit comprises a power supply circuit.

8. The system of claim 1, wherein the control circuit comprises a center-tapped transformer.

9. The system of claim 1, wherein the solenoid valve cannot be moved from a closed position to an open position by current sent from the control circuit.

10. A method for igniting a grill, the method comprising:
actuating a handle to mechanically open a solenoid valve which closes a switch when the solenoid valve is mechanically opened;
when the switch is closed, selectively sending a current to the solenoid valve to hold the solenoid valve open;
in response to the switch closing, sending an ignition current to an igniter to start ignition of the igniter;
determining whether a flame is being produced by a gas burner with receipt of a signal from a flame rectification sensor disposed with respect to the burner to be contacted by a flame produced by the burner, and the flame rectification sensor selectively providing the signal based upon the presence of a flame produced by the gas burner or based upon an absence of a flame produced by the gas burner, wherein the presence of a flame produced by the gas burner is identified with the identification of a change in the signal from the flame rectification sensor in comparison of the signal received during a time before current was sent to the igniter and the signal received during a time after current was sent to the igniter; and
after the presence of a flame produced by the gas burner is identified, continuing to monitor the flame detection signal for continued presence of the flame produced by the gas burner based upon a continuation of the signal received during the time after current was sent to the igniter,
sending the ignition current to the igniter when the signal based upon the presence of the flame produced by the gas burner is no longer received,
closing the solenoid valve by ceasing delivery of the current to the solenoid to hold the solenoid valve open when the signal based upon the presence of the flame produced by the gas burner is not received after a predetermined period of time after commencing sending the ignition current to the igniter.

11. The method of claim 10, wherein determining whether a flame is being produced by the gas burner comprises determining a derivative of the signal from the flame rectification sensor over a period from before the ignition current is sent to the igniter to after the ignition current is sent to the igniter.

12. The method of claim 10, further comprising changing an LED to flash a warning color when the signal based upon the presence of the flame produced by the gas burner is not received after a predetermined period of time after commencing sending the ignition current to the igniter.

13. The method of claim 10, further comprising after the solenoid was closed due to non-receipt of the signal based upon the presence of the flame produced by the gas burner after a period of time after commencing sending the ignition current to the igniter, maintaining the solenoid valve closed for at least a lock out period of time.

14. The method of claim 10, further comprising commencing flashing of an LED in response to the actuation of the handle to mechanically open the solenoid valve.

15. The method of claim 10, further comprising continuously powering an LED during receipt of the signal from the flame rectification sensor based upon the presence of the flame produced by the gas burner.

* * * * *